(12) United States Patent
Xie et al.

(10) Patent No.: US 6,608,278 B1
(45) Date of Patent: Aug. 19, 2003

(54) COATED MATERIAL WELDING WITH MULTIPLE ENERGY BEAMS

(75) Inventors: Jian Xie, Stevenson Ranch, CA (US); Paul Edward Denney, Columbus, OH (US)

(73) Assignee: Edison Welding Institute, Inc., Columbus, OH (US)

(*) Notice: Subject to any disclaimer, the term of this patent is extended or adjusted under 35 U.S.C. 154(b) by 0 days.

(21) Appl. No.: 10/030,518

(22) PCT Filed: Apr. 28, 2000

(86) PCT No.: PCT/US00/11431
§ 371 (c)(1),
(2), (4) Date: Oct. 26, 2001

(87) PCT Pub. No.: WO00/66314
PCT Pub. Date: Nov. 9, 2000

Related U.S. Application Data
(60) Provisional application No. 60/131,950, filed on Apr. 30, 1999.

(51) Int. Cl.[7] .......................... B23K 26/20; B23K 26/32
(52) U.S. Cl. ................................................. 219/121.64
(58) Field of Search ....................... 219/121.63, 121.64, 219/121.76, 121.77

(56) References Cited

U.S. PATENT DOCUMENTS

| | | | |
|---|---|---|---|
| 3,763,345 A | 10/1973 | Stohr | |
| 4,684,779 A | 8/1987 | Berlinger et al. | |
| 4,691,093 A | 9/1987 | Banas et al. | |
| 4,857,697 A | * 8/1989 | Melville | |
| 5,183,991 A | 2/1993 | Arai | |
| 5,187,346 A | * 2/1993 | Bilge et al. | |
| 5,595,670 A | 1/1997 | Mombo-Caristan | |
| 6,011,240 A | 1/2000 | Bishop et al. | |

FOREIGN PATENT DOCUMENTS

| | | |
|---|---|---|
| DE | 4024299 | 2/1992 |
| JP | 4-138888 | 5/1992 |

OTHER PUBLICATIONS

Glumann, J. R., et al. Welding with Combinationation of two CO2–Lasers—Advantages in Processing and Quality ICA-LEO 1993 No. 6, pp. 672–681.

* cited by examiner

Primary Examiner—Samuel M. Heinrich
(74) Attorney, Agent, or Firm—Gallagher & Dawsey LPA; David J. Dawsey; Michael J. Gallagher

(57) ABSTRACT

To overcome 1) the high levels of porosity due to coating material vaporization and entrapment into the weld, 2) spewing of molten base metal from the weld leaving holes and pits in the weld, and 3) humping effects when oblong beam configurations are used at higher weld speeds to weld coated materials, the present invention features an energy source (10) with multiple separated energy beams (24, 26) (formed by using multiple separate beam sources or manipulation of a single beam (14) into separated multiple energy beams (44, 46) using wedge mirror (18) and parabolic focusing mirror (20)) that produces high quality (porosity free) lap welds in a weld stack (50) of layered materials (30, 32) coated with coating material (28, 28', 34, 34') with zero gap at interface (38) during the welding process. An energy source (12) with multiple, separated energy beams (24, 26) extends the beam keyhole and increases the time and conditions available for vapor/gas to diffuse less violently through the molten weld pool.

9 Claims, 1 Drawing Sheet

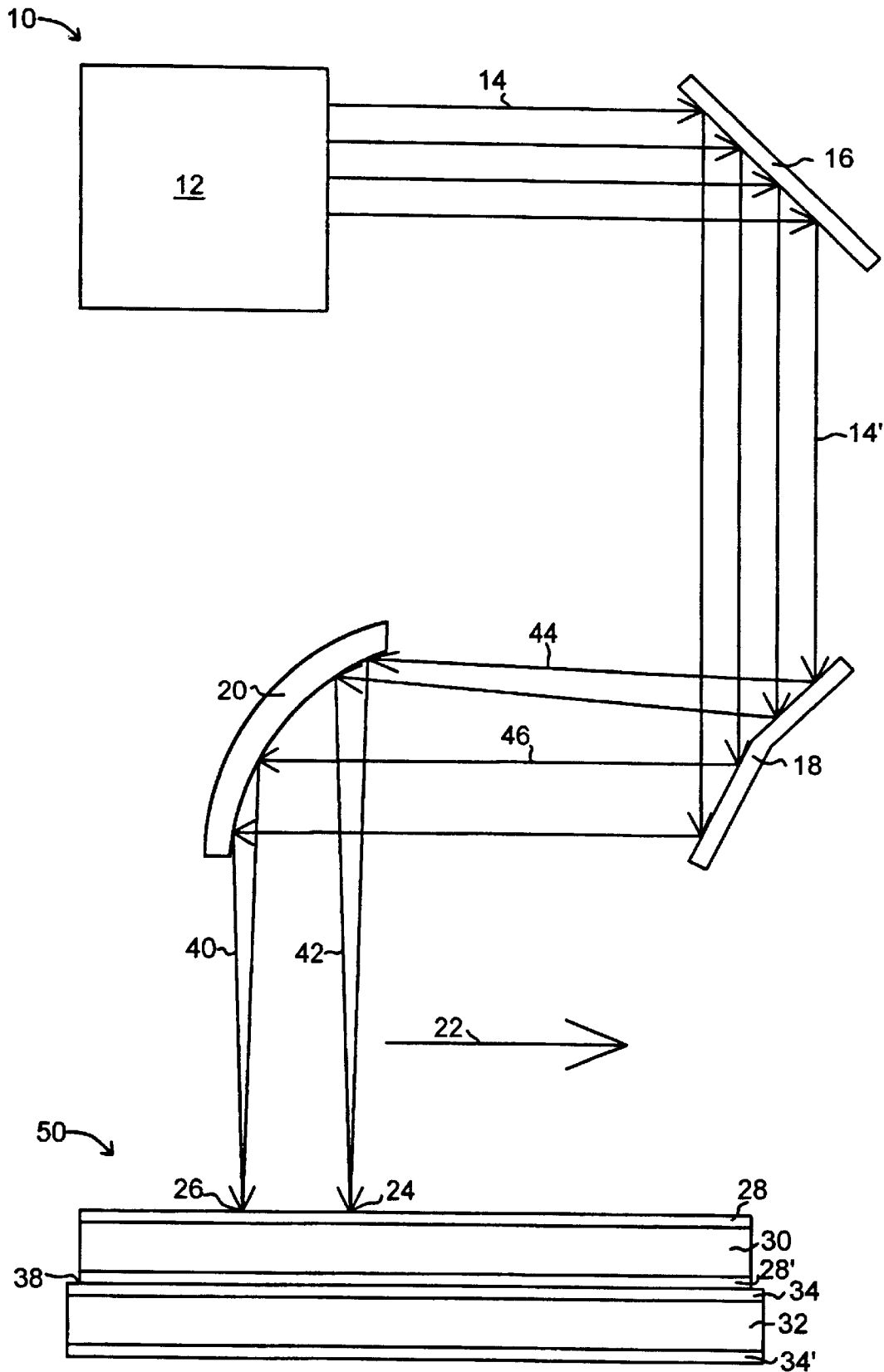
Figure

COATED MATERIAL WELDING WITH MULTIPLE ENERGY BEAMS

CROSS REFERENCE TO RELATED APPLICATION

This application is the United States national stage of PCT Application PCT/US00/1431 filed Apr. 28,2000 (published as WO 00/66314 on Nov. 9,2000) which claims the benefit of U.S. Provisional Application No. 60/131,950 filed on Apr. 30, 1999 all of which are incorporated by reference as if completely written herein.

BACKGROUND OF THE INVENTION

1. Field of the Invention

This invention pertains to the welding of coated materials and more particularly energy beam welding such as laser and electron beam welding of coated materials such as zinc and organic coated steel and other coated materials using an energy source with multiple, separated, energy beams.

2. Background of the Invention

Coated steels are used to make a variety of components for a number of industries. For example, zinc-coated steels are used for corrosion resistance for automobile bodies. Laser welding offers many advantages over conventional welding processes for joining zinc-coated steels such as one-sided access, less flange material (weight reduction), high welding speed, and improved structural stiffness. Consequently, there is major interest in developing reliable laser welding procedures to join coated steels in a lap-joint configuration. Unfortunately, the presence of the coating presents a major problem that limits the application of laser welding. The boiling point for most organic coatings is less than 400° C. and it is about 900° C. for zinc. Both are lower than the melting point of steel (about 1530° C.). When coated steel is laser welded in a lap-joint configuration, the low boiling point of the coating at the interface of the two sheets results in vaporization of the coating material. If the two coated sheets are clamped firmly together with no gap, the coating vapor can only escape through the weld pool or keyhole. The venting of the coating vapor causes expulsion of the molten metal during welding and a portion of the coating vapor typically remains entrapped as porosity in the weld. The laser weld surface is full of holes due to the expulsion of molten base metal by zinc vapor during welding and weld porosity is observed in the cross section of the weld due to entrapped coating vapor.

Over the last 15 years, there have been numerous attempts to develop reliable laser welding techniques to join coated materials in a lap configuration. Most of these studies have focused on producing acceptable welds by introducing a gap between the two sheets. For example, one method by which this can be accomplished is by setting up pre-placed shims or spacers before welding. With a gap, the coating vapor can escape via the gap instead of the weld pool and the expulsion of molten metal is eliminated. Therefore, introducing the small gap can produce better-quality laser welds. The gap is usually in the range of 0.1 and 0.2 mm depending on a number of variables such as the type of coating, thickness of coating, and sheet material composition, laser variables and travel speed.

However, industry is continuously looking for methods of laser welding coated steel in a lap-joint configuration with no gap because it is difficult to maintain a controlled gap in production. Researchers around the world have been attempting to produce high quality laser lap welds with zero gap for at least 15 years with little if any success. For example, in U.S. Pat. No. 5,595,670 an oblong laser beam was suggested as a method for welding un-coated and coated steels in butt and la-joint configurations. The gapping issue was not addressed with respect to welding coated steel in the patent. Attempts by the present inventors to use the oblong beam to improve lap weld quality for zinc-coated steel with no gap resulted in non-acceptable welds. The welds typically were porous with entrapped coating material. A specified weld defect that occurred with the oblong beam was humping (the periodic accumulation of portions of the base material that project above the surface of the sheet material) which was especially severe at high welding speeds.

In order to overcome the various problems encountered with welding coated materials, it is an object of the present invention to provide a welding process that allows coated materials to be welded with zero gap between the materials during the welding process.

Another object of this invention is to improve the weld quality of coated materials.

Another object of this invention is to reduce the cost of welding coated materials.

A further object of the present invention is to reduce substantially the weld porosity in welds of coated materials especially when welded with no gap between the coated materials.

Another object of the present invention is to reduce substantially the expulsion and spatter of molten metal from the weld pool during the welding process of coated materials.

It is another object of the present invention to reduce substantially the amount of entrapped coating material found in the welds of coated sheet stock.

It is an object of the present invention to reduce substantially the incidence of weld humping, that is, the accumulation of small projecting mounds of metal at regular intervals along the weld, in the resulting welds of coated materials.

It is an object of the present invention to produce porosity free welds when welding coated materials with zero gap.

It is an object of the present invention to reduce weld hardness of coated material welds.

It is an object of the present invention to reduce centerline cracking susceptibility of coated material welds.

It is an object of the present invention to produce quality welds in coated materials that are free of blow holes.

It is an object of the present invention to produce quality welds in coated materials that are free of weld irregularities.

It is an object of the present invention to produce quality welds in coated materials that are free of undercut.

The foregoing and other objects, features and advantages of the invention will become apparent from the following disclosure in which one or more preferred embodiments of the invention are described in detail. It is contemplated that variations in procedures may appear to a person skilled in the art without departing from the scope of or sacrificing any of the advantages of the invention.

SUMMARY OF THE INVENTION

The above problems are solved and objects met by the present invention which features a method of welding coated materials comprising the steps of: a) placing at least two layers of material together with essentially no (zero) gap between the materials in the weld zone and with at least one of the layers being coated with a coating material in the weld zone; b) focusing an energy source with multiple, separate, energy beams on the weld zone of the materials to be joined; and c) moving the energy source with multiple, separate, energy beams along the materials in the direction of the common axis of the energy beams to weld the layers of material together.

The multiple, separate, energy beams, typically laser beams, can be formed by using two or more (multiple) energy beams from separate beam sources with the beams juxtaposed one to the next along a line in the direction of the weld line, or, alternatively, dividing a single beam into two or more beams and aligning the multiple, separated, energy beams along a line in the direction of the weld.

At a minimum, one of the sheets in a lap-joint configuration is coated with an organic or inorganic coating on at least one side at the interface of the two layers of material to be welded. For example, one or both sides of a steel sheet may be coated with zinc (galvanized) by hot-dipping, electro-galvanizing or galvannealing. At least one of the coated sheets is placed in contact with a second sheet in a lap weld configuration with no gap between the sheets, that is, the sheets are in contact with each other with a coating material on at least one of the sheets between the two layers.

When a conventional circular or elongated energy beam is used, lap welds in coated materials with zero gap between the surfaces during welding produce high levels of porosity due to 1) vaporization of the coating material that spews out the material to be welded as the coating violently boils off, 2) entrapment of gas/vapor bubbles of the coating in the weld, and 3) humping of the weld at higher weld speeds using an elongated beam. On the other hand, multiple separated energy beams from either multiple sources or single beam division according to the present invention, produce high quality (porosity free) lap welds in coated materials with zero gap. Multiple, separated, energy beams appear to extend the beam keyhole and increase the time and conditions available for vapor/gas to diffuse less violently through the weld.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

BRIEF DESCRIPTION OF THE DRAWING

The FIGURE is a schematic drawing illustrating laser welding of a welding stack of two layers of material, each coated with a coating material on both sides in a law joint configuration with no gap between the two layers of material.

In describing the preferred embodiment of the invention which is illustrated in the drawing, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

The present invention features a no gap (zero gap) method for beam welding of coated materials such as steels, aluminum alloys, and other coated products including materials coated with inorganic and plastic coverings. A number of welding experiments were conducted on zinc-coated steels to assess the feasibility of producing high quality lap welds with zero gap using multiple energy beams. The materials included hot-dipped galvanized, electro-galvanized, and galvannealed steel. These materials were laser welded in a lap-joint configuration with zero gap between two sheets.

As shown in the Figure, the welding stack 50 is comprised of two layers of material 30 and 32 in a lap-joint configuration with no gap between the interface 38 of the two layers. Each of the layers 30 and 32 is coated with a coating material 28, 2' and 34,34', respectively, on both the upper and lower surfaces of each layer 30 and 32. It is to be realized, however, that only one interface 38 side of one of the layers 30 or 32 need be coated with a coating material. The composition of layer material 30 and 32 may be the same or different as long as the two materials are able to form a compatible weld pool and resulting weld. The coatings on each side of a layer may be the same or different. Thus it is possible that coating materials 28, 28', 34, and 34' may all be of different composition. Typically, layer material 30 and 32 are the same are coating materials 28, 28', 34, and 34'.

Dual separated $CO_2$ laser beams 40 and 42 were used for welding stack 50. The dual beams 40, 42 were obtained by splitting a single laser beam 14 from laser 12 into two separate beams 40, 42 by using the laser optic configuration denoted generally by the numeral 10. Laser beam 14 was split into two beams by means of a reflecting mirror 16, a wedge mirror 18 for splitting the reflected beam 14' into two beam components 44 and 46 which are then focused to two separated spots 24 and 26 using parabolic focusing mirror 20. By using an appropriate wedge mirror, it is possible to split beam 14' into more than two beam components and focus each of these beams into several spots affording three or more separated spots.

As used here, the beam is considered to be a Gaussian beam and the functional diameter of a beam is defined as the diameter where the laser power has dropped to at least 13.5% ($1/e^2$) or lower of the central value. In other words, the area within the functional beam diameter contains more than 86.5% of the total laser beam power of that beam. As used here, the term "multiple separated energy beams" means two or more energy beams whose functional diameters do not touch or intersect each other at the point of contact with the weld stack 50. Individual beams in the multiple beam configuration can be formed from a single beam source by using suitable optics such as the optic arrangement 10 shown in the Figure or by using multiple energy beam sources, that is, two or more energy sources 12, with each source providing a separate functional beam. Such energy sources are typically of the laser variety but other beamed energy sources can be used.

All of the welding trials were conducted using a 6 kW $CO_2$ laser. In the case of the dual beam laser welding trials, an optical beam splitting device such as illustrated in the Figure was developed that produced two laser spots of equal size (equal power) with spot spacings (center to center) ranging from 0.3–1.5 mm, that is, from a minimum, single keyhole, separated beam condition as noted above to a maximum separation at which two keyholes are formed. The individual laser spots were approximately 0.4 mm diameter. Welding trials were conducted using a beam focal length of 150 mm over a range of focus sizes (0–2 mm) and welding speeds (5.2–7.1 m/min).

As shown in the Figure, the energy source 10 was moved relative to the weld stack 50 in the direction 22 of the common axis of the multiple separated energy beams. That is, the direction of welding 22 essentially passed through the centers of beams 40 and 42. In other words, spot 26 followed behind spot 24 during the course of the welding process. As used here, moving the energy source relative to the weld stack means that the weld stack 50 can be held stationary (fixed) while the energy beam assembly 10 is moved over the fixed weld stack in the direction of the weld 22. Alternatively, the energy beam assembly 10 can be fixed while the weld stack 50 is moved with respect to the multiple separated energy beams 24 and 26. Or in a third alternative, both the weld stack 50 and the energy beam assembly can be moved with respect to each other along weld direction 22.

TABLE 1

Material/Laser Beam Configurations

| Case | Material | Beam Configuration |
| --- | --- | --- |
| 1 | 0.76 mm Hot-dipped | Dual Beam |
| 2 | 0.76 mm Electro-galvanized | Dual Beam |
| 3 | 0.64 mm Galvannealed | Dual Beam |
| 4 | 0.64 mm Galvannealed | Circular Beam |
| 5 | 0.76 mm Hot-dipped | Elliptical Beam |
| 6 | 0.76 mm Electro-galvanized | Elliptical Beam |

As shown in Table 1 comparative tests were made of various zinc-coated steels using prior art and the present invention beam configurations. In all cases studied, the quality of the separated dual beam lap welds was excellent. The use of an energy source with "multiple separate energy beams" produces lap welds with excellent surface appearance and through thickness quality under the demanding conditions of zero gap. Under the same conditions, single circular beams resulted in venting of the coating with expulsion of significant amounts of the base metal leaving holes in the resulting weld. Cross sections of the welds were taken and revealed that the unvented vaporized coating material was entrapped in the remaining base metal resulting in a quite porous weld. Similar results were observed when an elliptical beam was used. In addition, a surface defect referred to as "humping" was encountered at higher welding speeds when using the elliptical beam.

As has been demonstrated, the method of the present invention produces high quality lap welds with weld stacks of coated materials having a zero gap between the layers of material to be joined during the welding process. For materials such as coated steels, this has significant industrial application in a wide variety of applications where such materials are welded and offers significant economic benefits over prior art methods. This invention changes dramatically the welding of coated materials using an energy source such as a laser or electron beam.

In sum, it has been demonstrated that conventional (circular and elongated) laser beam lap welds in coated layered materials with zero gap between the layers 1) produce high levels of porosity due to vaporization of the coating materials and entrapment of gas/vapor bubbles, 2) spew large amounts of molten base metal from the weld leaving holes and gaps in the weld, and 3) at higher weld speeds, elongated beams produce a humping surface defect. In contrast, an energy source with "multiple separated energy beams" produced by separating multiple beams from a single beam source or by using separate beams from multiple sources produces high quality (porosity free) lap welds in layers of coated materials with zero gap between the layers. "Multiple separated energy beams" appear to extend the beam keyhole and increase the time available for vapor/gas to diffuse through the weld under less violent conditions than observed when single circular or oblong beams are used.

Finally it is to be realized that it is possible that changes in configurations to other than those shown could be used but that which is shown if preferred and typical. Without departing from the spirit of this invention, various energy sources for welding various materials with various coatings may be used. It is therefore understood that although the present invention has been specifically disclosed with the preferred embodiment and examples, modifications to the design concerning energy sources and layer and coating materials and their sizing, shape, and arrangement will be apparent to those skilled in the art and such modifications and variations are considered to be equivalent to and within the scope of the disclosed invention and the appended claims.

We claim:

1. A method of welding coated materials comprising the steps of:
   a) placing at least two layers of material together with no gap between said layers with at least one interface side of one of said layers being coated with a coating material in a weld region;
   b) focusing an energy source with multiple separated energy beams in the region of the materials to be joined so as to form a single keyhole; and
   c) moving said energy source relative to said layers of materials in the direction of the common axis of the multiple separated energy beams to weld said layers of material.

2. The method according to claim 1 wherein at least one of said layers of material is a steel material.

3. The method according to claim 1 wherein said coating material is zinc.

4. The method according to claim 1 wherein at least one of said layers of material is a steel material coated with zinc.

5. The method according to claim 1 with said layers of material comprising galvanized steel.

6. The method according to claim 1 in which said energy source is a laser beam.

7. The method according to claim 1 in which said energy source with multiple separated energy beams comprises more than one device for providing said multiple energy beams.

8. The method according to claim 1 in which said energy source with multiple energy beams comprises a single device for providing said multiple energy beams, said single device providing a single energy beam with said single energy beam divided into multiple, separated energy beams.

9. The method according to claim 1 wherein a functional diameter of each energy beam of said multiple energy beams do not touch each other.

* * * * *